United States Patent [19]

East et al.

[11] 3,761,739

[45] Sept. 25, 1973

[54] NON-METASTABLE ASYNCHRONOUS LATCH

[75] Inventors: Don G. East, Poughkeepsie; Donald G. Fugere, Wappingers Falls; Virgil R. Householder, Cold Spring; George C. Ling, Poughkeepsie, all of N.Y.

[73] Assignee: International Business Machines Corporation, Armonk, N.Y.

[22] Filed: June 23, 1972

[21] Appl. No.: 265,857

[52] U.S. Cl. .................. 307/206, 307/208, 307/286

[51] Int. Cl. .......................................... H03k 17/00

[58] Field of Search .................... 307/206, 286, 208, 307/218, 269, 258

[56] References Cited

UNITED STATES PATENTS 3,215,863 11/1965 Parham .............................. 307/206

3,290,517 12/1966 Akmenkalns ...................... 307/206

*Primary Examiner*—John W. Huckert
*Assistant Examiner*—B. P. Davis
*Attorney*—James E. Murray et al.

[57] ABSTRACT

This specification describes an asynchronous latch employing a tunnel diode to prevent the latch from entering what is referred to as a metastable state. The synchronous latch relies on the coincidental occurrence of at least two signals that occur randomly with respect to one another. When one of the pulses is rising while the other is falling the latch being unable to decipher the situation enters a metastable state and produces an output signal that falls halfway between its usual latched and unlatched outputs. The tunnel diode is used to detect an overlap in the transitions of the two signals and to activate the latch to prevent the occurrence of this metastable state.

5 Claims, 2 Drawing Figures

NON-METASTABLE ASYNCHRONOUS LATCH

BACKGROUND OF THE INVENTION

The present invention relates to latch circuits for information handling systems and more particularly to the use of a tunnel diode to eliminate the occurrence of an indeterminate output signal in such latch circuits.

An asynchronous latch circuit relies on the coincidence of at least two signals that occur randomly with respect to one another. When these signals overlap to any great extent the latch circuit latches and alternatively, if one or the other of the signals occurs by itself, the latch circuit will not latch. Since the signals are random, at times one signal will fall while the other signal is rising. When this situation occurs, the latch cannot tell whether there was or was not the coincidental occurrence of the two signals. This causes the latch to enter an indeterminate or metastable state. In that state the latch provides an output signal which, in magnitude, is halfway between the up and down binary signals employed in the information handling system. The metastable state is undecipherable by other circuits in the information handling system causing an error condition to exist.

BRIEF DESCRIPTION OF THE INVENTION

Therefore, in accordance with the present invention the occurrence of a metastable state is eliminated. This is accomplished by incorporating a tunnel diode into the latch. The tunnel diode detects small changes in current resulting from any coincidence of the signal pulses. The tunnel diode then latches to provide sufficient time to permit latching of the latch.

Therefore, it is an object of the present invention to eliminate a metastable state in a latch.

Another object of the present invention is to improve the operation of the latch.

DESCRIPTION OF THE DRAWINGS

These and other objects, features and advantages of the invention will be apparent from the following more particular description of the preferred embodiment of the invention as illustrated in the accompanying drawings, of which:

In FIG. 1, a current switch circuit 10 receives inputs from a data signal source 11 and a clock pulse source 12 at the bases of transistors 13 and 14. The collectors of these transistors 13 and 14 are connected through a resistor 16 to a positive terminal 18 of a voltage source while the emitters of the two transistors 13 and 14 are connected through resistor 19 to the negative terminal 20 of the source. The emitters also are connected to the emitter of a third transistor 22 whose base is grounded and whose collector provides an output signal for the current switch circuit 10 to node A.

Figure 1:
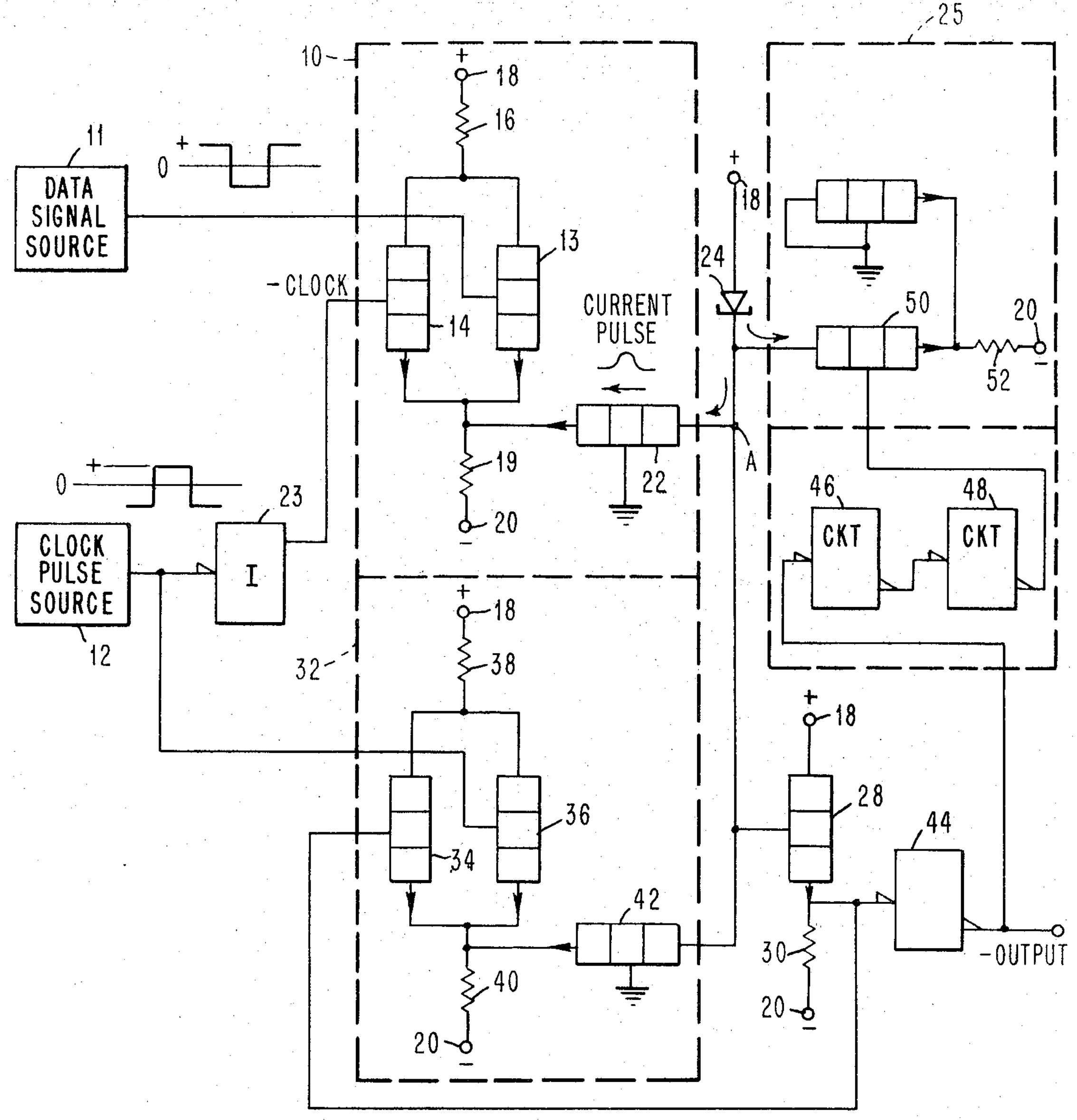
FIG. 1 is a circuit schematic of one embodiment of the invention.

So long as the bases of transistors 13 and 14 remain above ground potential they will individually or collectively conduct. With either transistor 13 or 14 conducting sufficient current is drawn through a current source comprising the mentioned voltage source and resistor 19 to leave transistor 22 nonconducting by biasing its emitter at a sufficiently high potential to hold transistor 22 off. However, when a negative or down signal from the data signal source 11 is supplied to the base of transistor 13 in coincidence with a negative or down clock pulse supplied from the clock pulse source 12 through inverter 23 to the base of transistor 14, both transistors 13 and 14 stop conducting causing transistor 22 to conduct and increase the current flow through a tunnel diode 24 connected between node A and the positive terminal 18 of the source.

Figure 2:
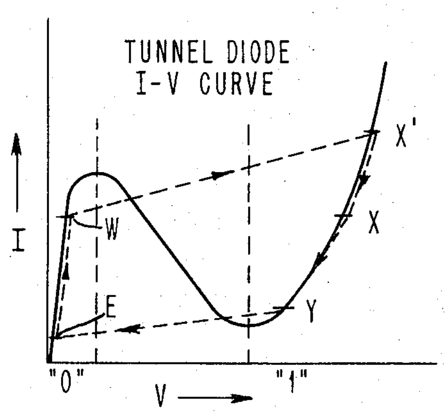
FIG. 2 is the operating characteristics of the tunnel diode shown in FIG. 1.

As shown in FIG. 2, prior to the receipt of the current pulse, a biasing network 25 maintained the operation of tunnel diode 24 at point W on its characteristic curve. When a current pulse, as the one described above, is produced by the coincidence of the data and clock pulses the current through the tunnel diode 24 increases to a point where its operating point on its characteristic curve shifts from point W to point X′ and the current pulse subsides to point X.

The change in operating point of the tunnel diode 24 causes the potential at node A to drop. This drop in potential is applied to the base of transistor 28 in an emitter follower circuit comprising transistor 28 and resistor 30. The output of the emitter follower circuit is fed to the input of a second current switch circuit 32. The second current switch circuit 32 contains one input transistor 34 whose base is connected to the output of the emitter follower and another input transistor 36 whose base is connected to the clock pulse source 12. The collectors of these transistors 34 and 36 are connected together through a resistor 38 to the positive terminal 18 of the voltage source and the emitters of the two transistors are connected through resistor 40 to the negative terminal 20 of the voltage source. The emitters of the two transistors 34 and 36 are also connected to the emitters of a third transistor 42 whose collector is connected to node A and whose base is coupled to ground.

With the lowering of the potential at node A a negative or down level is provided by the output of the emitter follower to the base of transistor 34. If the clock pulse is still up at that time, the base of transistor 36 is at an up or positive level so that transistor 36 continues to conduct holding transistor 42 off by maintaining the emitter-base potential of transistor 42 at an insufficient level for conduction. Therefore, the latch will not latch. However, after the clock pulse subsides the base of transistor 36 also goes negative turning transistor 36 off. With both transistors 34 and 36 off the emitter of transistor 42 drops and transistor 42 conducts to latch node A at a down level of potential. Therefore, node A will be maintained at this down level so long as the clock pulse does not come back up and render transistor 36 conductive.

Above we have described how this circuit latches up once negative clock and data signals are simultaneously applied to the bases of transistors 13 and 14. Of course, if the negative signals are not so applied transistor 22 does not conduct and node A remains at its up level. As a result transistor 34 continues to conduct after the cessation of the clock pulse, thus maintaining transistor 42 off and, therefore, node A at an up level irrespective of whether the clock pulse is up or not.

Once the clock pulse has subsided and node A has either assumed its latched or unlatched potential, the tunnel diode is no longer needed to maintain the operation of the circuit. However, it will be needed at the occurrence of the next clock pulse and if it latched at the last clock pulse it must be brought back to its unlatched state W so that it can detect a small current pertubation at node A. To this end the current supplied by the biasing network 25 for the tunnel diode 24 is reduced after the circuit has latched to shift the operating point from the tunnel diode from point X on its operating curve to point Y on the curve.

To see how this is accomplished, assume that the circuit is latched by the application of both a negative data and clock pulse to the inputs of the current switch 10. Then, as described above, node A drops in potential and the output of the emitter follower circuit assumes a down level. The output of the emitter follower circuit is passed through one non-inverting stage 44 to constitute the output of the latch. The output of the latch is then channeled through two more non-inverting stages 46 and 48 to the base of a switching transistor 50 which controls the amount of current supplied to the tunnel diode 24 by the biasing network 25. After a delay resulting from the operating times of the logic blocks 44, 46 and 48, the voltage at the base of transistor 50 is reduced, decreasing the current flowing out of the collector of transistor 50. This reduction in current shifts the tunnel diode's operating point along its characteristic curve from point X to point Y.

When reset subsequently occurs, a positive clock reaches the base of transistor 36 turning transistor 36 on and transistor 42 off. This reduces the current flow through node A. Since the biasing network 25 operates as a constant current source, the current reduction occurs through the tunnel diode 24 causing the tunnel diode to shift from point Y on the characteristic curve to point Z on the characteristic curve. When operation of the tunnel diode 24 shifts to point Z node A assumes its high voltage level and through transistor 28 in the emitter follower causes the base of transistor 34 to rise also thereby unlatching the latch. When the latch unlatches, the output of the latch rises. This rise in the output is fed through the delay block to the base of transistor 50 increasing the current supplied by the biasing network to tunnel diode 24 causing the tunnel diode to shift from point Z on the characteristic curve to point W on the characteristic curve. At point W, the tunnel diode is ready to detect the next pulse.

If the circuit had not latched, of course, there would be no resetting of the tunnel diode 24 and resetting would not be necessary since node A would have remained at its up level and tunnel diode 24 at point W on its characteristic curve and, therefore, the circuit would be ready for operation without the resetting of the latch or the tunnel diode.

The logic blocks 23, 44, 46 and 48 are standard logic blocks used in the usual manner to invert signals or provide a delay along the signal path. The biasing network 25 comprises the transistor 50, a resistor 52 and a diode 54 for providing two-way switching of current.

Therefore, while the invention has been shown and described with respect to the preferred embodiment thereof, it will be understood by those skilled in the art that various changes in form and detail may be made therein without departing from the spirit and scope of the invention.

What is claimed is:

1. In a latch circuit which has an input stage for accepting multiple inputs and providing an output signal when they are in coincidence and also has a reset stage for latching the latch circuit on theeocc occurrence of said output signal and resetting the latch circuit to place it in condition to sense the next set of multiple input signals, apparatus for improving the sensitivity of the latch to detect overlaps in the leading and trailing edges of the muptiple inputs, comprising:

a tunnel diode means coupled to the output of the input stage for switching from its low voltage to high voltage state on the occurrence of an output signal from the input stage;

current source means coupled to the tunnel diode with level adjustment means to bias the tunnel diode at a high current level to detect the occurrence of the output signal and a low current level to permit the tunnel diode to switch to the low voltage state when the latch is reset; and delay means for coupling the output of the latch to the adjustment means of the constant current source so that the constant current source is adjusted as a function of the output signal whereby the tunnel diode senses small overlaps in the two signals and holds the output of the input stage at the desired level until the circuit is latched at that level by the reset stage.

2. The latch circuit of claim 1 wherein said current source means includes a transistor whose collector is coupled to the tunnel diode to provide the biasing current to the tunnel diode and whose base is coupled to the delay means for the receipt of signals which are a function of the output signal so that said transistor comprises adjustment means of the delay means.

3. The latch circuit of claim 1 wherein the input and reset stages are AND gates whose outputs are coupled together and connected to one of the inputs of the reset state to provide the latching function for the latch.

4. The latch circuit of claim 3 wherein the multiple inputs are clock and data inputs and wherein the reset input is the clock input.

5. The latch circuit of claim 4 wherein the delay means is for delaying the signal to the transistor until after the clock pulse subsides.

* * * * *